Figure 1:
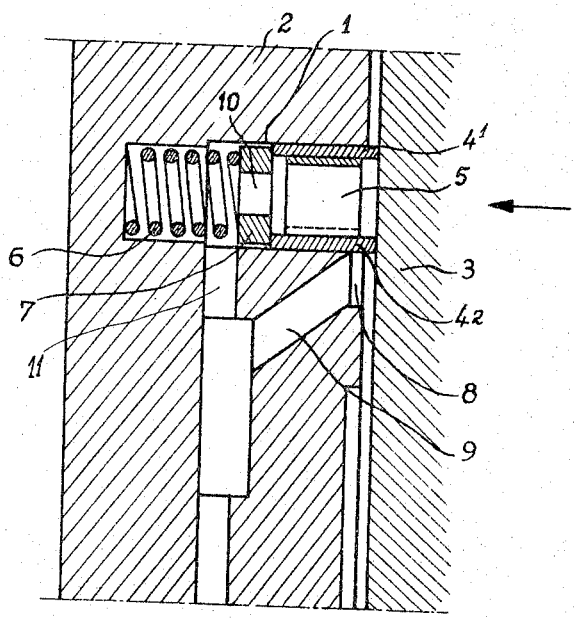

April 18, 1967 L. PÉRAS 3,314,682
LATERAL SEALING RINGS FOR ROTARY ENGINES
Filed May 18, 1964

Inventor
Lucien Péras
By Stevens, Davis, Miller + Mosher
Attorneys

United States Patent Office 3,314,682
Patented Apr. 18, 1967

3,314,682
LATERAL SEALING RINGS FOR ROTARY ENGINES
Lucien Péras, Billancourt, France, assignor to Regie Nationale des Usines Renault, Billancourt, France
Filed May 18, 1964, Ser. No. 368,054
Claims priority, application France, May 30, 1963, 936,610, Patent 1,366,863
1 Claim. (Cl. 277—76)

This invention relates in general to rotary engines of the type comprising a rotor adapted to perform a simple or complex movement of rotation within a stationary stator, and more particularly to a specific form of embodiment of sealing rings adapted to maintain a lateral oil seal between the rotor and stator of rotary engines of this character.

It is current practice to use for this end either conventional metal rings or lipped rings made of metal, rubber or plastic. These rings are fitted in a circular groove formed in the stator or in the rotor.

Conventional metal rings are generally of the piston-ring type but they are objectionable in that they move transversely in their groove and consequently engage alternatively the inner side and the outer side of this groove due to the stress applied to the ring during the engine operation, for it is not possible to prestress these rings sufficiently to provide a constant engagement thereof either with the inner side or with the outer side of the groove. Under these conditions, during short moments these rings permit the passage of oil simultaneously on both sides, thus impairing considerably their efficiency. Moreover, under certain conditions the ring movement may lead to a particularly detrimental oil pumping effect.

Lipped or flanged metal rings are objected to on account of their relatively great stiffness and involve abnormally high operating pressures reducing their useful life. Besides, rubber or plastic rings are generally short-lived due to the relatively high temperatures to which they are subjected under normal service conditions.

This invention is concerned with a ring for the purpose set forth hereinabove which is free of these various drawbacks. A ring according to this invention consists essentially of a pair of concentric scraper strips and of an expansion spring disposed between said strips and adapted to urge each strip against the corresponding side wall of the ring groove. On the other hand, the segments are constantly pressed against the surface with which they are to form a joint by spring means engaging the edges of said strips which are opposite to the scraper edges thereof.

Figure 2:
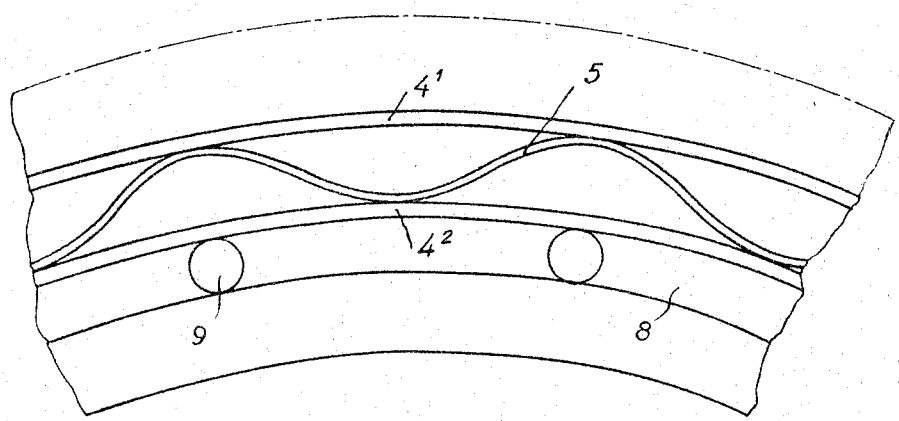

The features and advantages of the sealing rings forming the subject-matter of this invention will appear more clearly as the following description proceeds with reference to the accompanying drawing illustrating diagrammatically by way of example and on a considerably enlarged scale a typical form of embodiment of a ring constructed according to the teachings of this invention. In the drawing:

FIGURE 1 is a fragmentary cross-section of a sealing ring fitted in its groove, and FIGURE 2 is a fragmentary front elevational view, taken in the direction of the arrow on the right-hand side of FIGURE 1, showing the wavy shape of the expansion spring.

Referring to FIGURE 1 of the drawing, the reference numeral 1 designates the circular groove formed in the inner face of one of the flanges of stator 2, the rotor 3 effecting in a plane parallel to said face a simple or complex movement of rotation.

Of course, the reverse mounting, i.e. with the groove 1 formed in the rotor 3 instead of in the stator 2, may be contemplated without departing from the basic principle of this invention.

The sealing ring according to this invention and fitted in the groove 1 consists of two scraper strips $4^1$, $4^2$ each resiliently pressed against the relevant side wall of the groove by the expansion spring 5.

Referring to FIGURE 2 it will be seen that this expansion spring 5 consists of a corrugated or wavy blade bearing with its outer and inner portions against the outer and inner strips $4^1$, $4^2$ respectively. Of course, it would not constitute a departure from the spirit and scope of this invention to use an expansion spring having a different configuration, for example a coil spring having flattened or otherwise altered convolutions.

The sealing ring is urged against the surface with which it is required to form a joint by spring means, in this example a plurality of coil compression springs 6, adapted to bear against said scraper strips $4^1$, $4^2$ either directly or through the medium of a washer 7 disposed in the groove 1.

The two scraper strips $4^1$, $4^2$ project slightly from the face of the stator or rotor in which their mounting groove is formed.

Thus, any oil scraped or retained by strip $4^2$ is collected in the circular groove 8 and directed through drain holes 9 towards the engine oil-sump.

On the other hand, any oil scraped or retained by strip $4^1$ flows through the hole 10 of washers 7 and subsequently through drain holes 11 to the engine oil-sump.

The scraper strips comprise of course along their peripheral contour a gap of a width consistent with the strip expansion. Preferably, these strips have a moderate thickness and may be made from any material having suitable friction characteristics. If desired, the surface of their scraper edges may be case-hardened or otherwise treated, or provided with a surface lining promoting this frictional contact. Furthermore, the scraper edges may be slightly bevelled to accelerate the running-in.

I claim:

Lateral sealing rings for rotary engines comprising a circular groove formed in one of the two registering faces belonging one to the rotor and the other to the stator of said engine, first and second concentric endless scraper strips disposed in said groove, an expansion spring positioned between said strips to bias them in a radial direction towards a spaced relationship against respective adjacent side walls of said groove, further spring means disposed in the bottom of said groove perpendicular to said registering faces to bias said strips towards the opposite face, and first and second conduit means connecting the radially inward surface of said first and second strips respectively to an engine oil sump whereby oil retained by said strips will be returned to said sump.

References Cited by the Examiner

UNITED STATES PATENTS

| 1,871,820 | 8/1932 | Morton | 277—72 |
| 1,963,151 | 6/1934 | Russell | 277—79 |
| 2,363,110 | 11/1944 | Krug | 277—38 |
| 3,139,233 | 6/1964 | Simonsen | 123—8 |

FOREIGN PATENTS 1,277,311  10/1961  France.

LAVERNE D. GEIGER, *Primary Examiner.*

D. B. MASSENBERG, *Assistant Examiner.*